US011697552B2

(12) United States Patent
Koga et al.

(10) Patent No.: US 11,697,552 B2
(45) Date of Patent: Jul. 11, 2023

(54) ELECTRIC POWER TAKE-OFF PUMP CONTROL SYSTEMS

(71) Applicant: Oshkosh Corporation, Oshkosh, WI (US)

(72) Inventors: Jeffrey Koga, Oshkosh, WI (US); Emily Davis, Rochester, MN (US); Jerrod Kappers, Oshkosh, WI (US); Vince Schad, Oshkosh, WI (US); Robert S. Messina, Oshkosh, WI (US); Christopher K. Yakes, Oshkosh, WI (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Nader Nasr, Neenah, WI (US); Chad K. Smith, Omro, WI (US); Logan Gary, Oshkosh, WI (US); Derek A. Wente, Austin, MN (US); Shawn Naglik, Oshkosh, WI (US); Mike J. Bolton, Oshkosh, WI (US); Jacob Wallin, Oshkosh, WI (US); Quincy Wittman, Oshkosh, WI (US); Christopher J. Rukas, Oshkosh, WI (US); Dylan Hess, Oshkosh, WI (US); Jason Rice, Oshkosh, WI (US); Zhenyi Wei, Oshkosh, WI (US); Bashar Amin, Oshkosh, WI (US); Catherine Linsmeier, Oshkosh, WI (US); Joshua D. Rocholl, Rochester, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/483,991

(22) Filed: Sep. 24, 2021

(65) Prior Publication Data

US 2022/0097961 A1 Mar. 31, 2022

Related U.S. Application Data

(60) Provisional application No. 63/084,378, filed on Sep. 28, 2020.

(51) Int. Cl.
| | | |
|---|---|---|
| *B65F 3/02* | (2006.01) | |
| *B60K 17/28* | (2006.01) | |
| *F15B 13/02* | (2006.01) | |

(52) U.S. Cl.
CPC ............... *B65F 3/02* (2013.01); *B60K 17/28* (2013.01); *F15B 13/026* (2013.01); *B65F 2003/025* (2013.01)

(58) Field of Classification Search
CPC ....... B65F 3/02; B65F 2003/025; F04B 1/146
See application file for complete search history.

(56) References Cited

U.S. PATENT DOCUMENTS 3,864,059 A * 2/1975 Smith ................... F04B 49/007
417/302
4,797,069 A * 1/1989 Hartley ................... F04B 1/146
417/222.1

(Continued)

*Primary Examiner* — Jonathan Snelting
(74) *Attorney, Agent, or Firm* — Foley & Lardner LLP

(57) ABSTRACT

A refuse vehicle includes a chassis, an energy storage device, a vehicle body, an electric power take-off system, and a hydraulic component. The energy storage device is supported by the chassis and is configured to provide electrical power to a prime mover. Activation of the prime mover selectively drives the refuse vehicle. The vehicle body is supported by the chassis, and includes an on-board receptacle for storing refuse therein. The electric power take-off system is positioned on the vehicle body, and (Continued)

US 11,697,552 B2

Page 2 includes an electric motor configured to drive a hydraulic pump to convert electrical power received from the energy storage device into hydraulic power. An amount of electrical power at least one of received by and provided to the electric motor is limited by a controller to control an output characteristic of the hydraulic pump. The hydraulic component is in fluid communication with the hydraulic pump and configured to operate using hydraulic power from the electric power take-off system.

17 Claims, 8 Drawing Sheets

(56) References Cited

U.S. PATENT DOCUMENTS

| | | | |
|---|---|---|---|
| 5,007,786 A * | 4/1991 | Bingman | B65F 3/001 414/409 |
| 5,285,020 A * | 2/1994 | Jurca | G01G 19/10 177/139 |
| 9,216,856 B2 * | 12/2015 | Howell | B65F 3/143 |
| 9,487,086 B2 * | 11/2016 | Collett | B60K 25/06 |
| 10,703,356 B2 * | 7/2020 | Lacroix | F16H 61/0025 |
| 2002/0071336 A1 | 6/2002 | Smith et al. | |
| 2002/0103580 A1 | 8/2002 | Yakes et al. | |
| 2003/0158638 A1 | 8/2003 | Yakes et al. | |
| 2003/0205422 A1 | 11/2003 | Morrow et al. | |
| 2004/0002794 A1 | 1/2004 | Pillar et al. | |
| 2004/0133332 A1 | 7/2004 | Yakes et al. | |
| 2004/0199302 A1 | 10/2004 | Pillar et al. | |
| 2005/0113988 A1 | 5/2005 | Nasr et al. | |
| 2005/0113996 A1 | 5/2005 | Pillar et al. | |
| 2005/0119806 A1 | 6/2005 | Nasr et al. | |
| 2005/0209747 A1 | 9/2005 | Yakes et al. | |
| 2005/0234622 A1 | 10/2005 | Pillar et al. | |
| 2006/0022001 A1 | 2/2006 | Linsmeier et al. | |
| 2006/0032701 A1 | 2/2006 | Linsmeier et al. | |
| 2006/0032702 A1 | 2/2006 | Linsmeier et al. | |
| 2006/0065411 A1 | 3/2006 | Linsmeier et al. | |
| 2006/0065451 A1 | 3/2006 | Morrow et al. | |
| 2006/0066109 A1 | 3/2006 | Nasr | |
| 2006/0070776 A1 | 4/2006 | Morrow et al. | |
| 2006/0071645 A1 | 4/2006 | Bolton | |
| 2006/0086566 A1 | 4/2006 | Linsmeier et al. | |
| 2006/0106521 A1 | 5/2006 | Nasr et al. | |
| 2007/0088469 A1 | 4/2007 | Schmiedel et al. | |
| 2007/0288131 A1 | 12/2007 | Yakes et al. | |
| 2007/0291130 A1 | 12/2007 | Broggi et al. | |
| 2008/0059014 A1 | 3/2008 | Nasr et al. | |
| 2008/0065285 A1 | 3/2008 | Yakes et al. | |
| 2008/0071438 A1 | 3/2008 | Nasr et al. | |
| 2008/0114513 A1 | 5/2008 | Pillar et al. | |
| 2008/0150350 A1 | 6/2008 | Morrow et al. | |
| 2009/0033044 A1 | 2/2009 | Linsmeier | |
| 2009/0079839 A1 | 3/2009 | Fischer et al. | |
| 2009/0127010 A1 | 5/2009 | Morrow et al. | |
| 2009/0194347 A1 | 8/2009 | Morrow et al. | |
| 2010/0116569 A1 | 5/2010 | Morrow et al. | |
| 2010/0301668 A1 | 12/2010 | Yakes et al. | |
| 2011/0312459 A1 | 12/2011 | Morrow et al. | |
| 2012/0143430 A1 | 6/2012 | Broggi et al. | |
| 2013/0196806 A1 | 8/2013 | Morrow et al. | |
| 2014/0259476 A1 | 9/2014 | Amin et al. | |
| 2014/0262355 A1 | 9/2014 | Linsmeier | |
| 2015/0210313 A1 | 7/2015 | Sears et al. | |
| 2015/0283894 A1 | 10/2015 | Morrow et al. | |
| 2016/0001765 A1 | 1/2016 | Shukla et al. | |
| 2016/0297417 A1 | 10/2016 | Shukla et al. | |
| 2016/0361987 A1 | 12/2016 | Morrow et al. | |
| 2017/0008507 A1 | 1/2017 | Shukla et al. | |
| 2017/0051462 A1 | 2/2017 | Amin et al. | |
| 2017/0121108 A1 | 5/2017 | Davis et al. | |
| 2017/0253221 A1 | 9/2017 | Verhoff et al. | |
| 2017/0361491 A1 | 12/2017 | Datema et al. | |
| 2017/0361492 A1 | 12/2017 | Datema et al. |
| 2018/0072303 A1 | 3/2018 | Shukla et al. |
| 2018/0215354 A1 | 8/2018 | Linsmeier et al. |
| 2018/0215597 A1 | 8/2018 | Linsmeier et al. |
| 2018/0265289 A1 | 9/2018 | Davis et al. |
| 2018/0289999 A1 | 10/2018 | Kay et al. |
| 2018/0293818 A1 | 10/2018 | Linsmeier et al. |
| 2018/0297597 A1 | 10/2018 | Linsmeier et al. |
| 2018/0345783 A1 | 12/2018 | Morrow et al. |
| 2019/0039407 A1 | 2/2019 | Smith |
| 2019/0091890 A1 | 3/2019 | Rocholl et al. |
| 2019/0121353 A1 | 4/2019 | Datema et al. |
| 2019/0185077 A1 | 6/2019 | Smith et al. |
| 2019/0193934 A1 | 6/2019 | Rocholl et al. |
| 2019/0262646 A1 | 8/2019 | Linsmeier et al. |
| 2019/0263408 A1 | 8/2019 | Linsmeier et al. |
| 2019/0291711 A1 | 9/2019 | Shukla et al. |
| 2019/0322321 A1 | 10/2019 | Schwartz et al. |
| 2019/0325220 A1 | 10/2019 | Wildgrube et al. |
| 2019/0344475 A1 | 11/2019 | Datema et al. |
| 2019/0351883 A1 | 11/2019 | Verhoff et al. |
| 2019/0359184 A1 | 11/2019 | Linsmeier et al. |
| 2019/0359460 A1 | 11/2019 | Linsmeier et al. |
| 2019/0360600 A1 | 11/2019 | Jax et al. |
| 2019/0381990 A1 | 12/2019 | Shukla et al. |
| 2020/0039341 A1 | 2/2020 | Morrow et al. |
| 2020/0078986 A1 | 3/2020 | Clifton et al. |
| 2020/0108285 A1 | 4/2020 | Kay et al. |
| 2020/0139804 A1 | 5/2020 | Holmes et al. |
| 2020/0230841 A1 | 7/2020 | Datema et al. |
| 2020/0230842 A1 | 7/2020 | Datema et al. |
| 2020/0238115 A1 | 7/2020 | Linsmeier et al. |
| 2020/0262366 A1 | 8/2020 | Wildgrube et al. |
| 2020/0265656 A1 | 8/2020 | Koga et al. |
| 2020/0279444 A1 | 9/2020 | Linsmeier et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0347661 A1 | 11/2020 | Rocholl et al. |
| 2020/0347857 A1 | 11/2020 | Clifton et al. |
| 2020/0348681 A1 | 11/2020 | Clifton et al. |
| 2020/0348764 A1 | 11/2020 | Clifton et al. |
| 2020/0398670 A1 | 12/2020 | Rocholl et al. |
| 2020/0398695 A1 | 12/2020 | Rocholl et al. |
| 2020/0398697 A1 | 12/2020 | Rocholl et al. |
| 2020/0398772 A1 | 12/2020 | Wildgrube et al. |
| 2020/0398857 A1 | 12/2020 | Clifton et al. |
| 2020/0399057 A1 | 12/2020 | Rocholl et al. |
| 2020/0399058 A1 | 12/2020 | Rocholl et al. |
| 2020/0401807 A1 | 12/2020 | Wildgrube et al. |
| 2020/0402325 A1 | 12/2020 | Koga et al. |
| 2021/0031611 A1 | 2/2021 | Yakes et al. |
| 2021/0031612 A1 | 2/2021 | Yakes et al. |
| 2021/0031649 A1 | 2/2021 | Messina et al. |
| 2021/0054942 A1 | 2/2021 | Jax et al. |
| 2021/0069934 A1 | 3/2021 | Rocholl et al. |
| 2021/0070595 A1 | 3/2021 | Holmes et al. |
| 2021/0088036 A1 | 3/2021 | Schubart et al. |
| 2021/0107361 A1 | 4/2021 | Linsmeier et al. |
| 2021/0124347 A1 | 4/2021 | Datema et al. |
| 2021/0139303 A1 | 5/2021 | Rosencrance et al. |
| 2021/0143663 A1 | 5/2021 | Bolton |
| 2021/0162630 A1 | 6/2021 | Clifton et al. |
| 2021/0188076 A1 | 6/2021 | Morrow et al. |
| 2021/0213642 A1 | 7/2021 | Datema et al. |
| 2021/0221216 A1 | 7/2021 | Yakes et al. |

(56) References Cited

U.S. PATENT DOCUMENTS

| | | |
|---|---|---|
| 2021/0225095 A1 | 7/2021 | Koga et al. |
| 2021/0229320 A1 | 7/2021 | Datema et al. |
| 2021/0229755 A1 | 7/2021 | Schwartz et al. |
| 2021/0229908 A1 | 7/2021 | Rocholl et al. |
| 2021/0252995 A1 | 8/2021 | Rocholl et al. |
| 2021/0253102 A1 | 8/2021 | Linsmeier et al. |
| 2021/0271884 A1 | 9/2021 | Wildgrube et al. |
| 2021/0276450 A1 | 9/2021 | Eshleman et al. |
| 2021/0292086 A1 | 9/2021 | Mahan et al. |
| 2021/0316740 A1 | 10/2021 | Clifton et al. |
| 2021/0316741 A1 | 10/2021 | Clifton et al. |
| 2021/0323436 A1 | 10/2021 | Rocholl et al. |
| 2021/0323437 A1 | 10/2021 | Rocholl et al. |
| 2021/0323438 A1 | 10/2021 | Rocholl et al. |
| 2021/0323763 A1 | 10/2021 | Koga et al. |
| 2021/0323764 A1 | 10/2021 | Koga et al. |
| 2021/0323765 A1 | 10/2021 | Koga et al. |
| 2021/0324880 A1 | 10/2021 | Wente et al. |
| 2021/0325529 A1 | 10/2021 | Koga et al. |
| 2021/0325911 A1 | 10/2021 | Koga et al. |
| 2021/0326550 A1 | 10/2021 | Kappers et al. |
| 2021/0327164 A1 | 10/2021 | Koga et al. |
| 2021/0327170 A1 | 10/2021 | Rocholl et al. |
| 2021/0327237 A1 | 10/2021 | Rocholl et al. |
| 2021/0331635 A1 | 10/2021 | Wildgrube et al. |
| 2021/0331636 A1 | 10/2021 | Wildgrube et al. |
| 2021/0331637 A1 | 10/2021 | Wildgrube et al. |
| 2021/0339065 A1 | 11/2021 | Linsmeier et al. |
| 2021/0339632 A1 | 11/2021 | Rocholl et al. |
| 2021/0339648 A1 | 11/2021 | Koga et al. |
| 2021/0339949 A1 | 11/2021 | Rocholl et al. |
| 2021/0345062 A1 | 11/2021 | Koga et al. |
| 2021/0362696 A1 | 11/2021 | Verhoff et al. |
| 2021/0362697 A1 | 11/2021 | Verhoff et al. |
| 2021/0370893 A1 | 12/2021 | Verhoff et al. |
| 2021/0370894 A1 | 12/2021 | Verhoff et al. |
| 2021/0373560 A1 | 12/2021 | Koga et al. |
| 2021/0380085 A1 | 12/2021 | Verhoff et al. |
| 2021/0380179 A1 | 12/2021 | Smith et al. |
| 2021/0394394 A1 | 12/2021 | Datema et al. |
| 2021/0396251 A1 | 12/2021 | Clifton et al. |
| 2021/0407222 A1 | 12/2021 | Koga et al. |
| 2022/0009338 A1 | 1/2022 | Yakes et al. |
| 2022/0009761 A1 | 1/2022 | Archer et al. |
| 2022/0144226 A1 | 5/2022 | Verhoff et al. |
| 2022/0144227 A1 | 5/2022 | Verhoff et al. |

\* cited by examiner

US 11,697,552 B2

ELECTRIC POWER TAKE-OFF PUMP CONTROL SYSTEMS

CROSS-REFERENCE TO RELATED APPLICATION

This application claims priority to U.S. Provisional Patent Application No. 63/084,378, filed Sep. 28, 2020, the content of which is hereby incorporated by reference in its entirety.

BACKGROUND

Electric refuse vehicles (i.e., battery-powered refuse vehicles) include one or more energy storage elements (e.g., batteries) that supply energy to an electric motor. The electric motor supplies rotational power to the wheels of the refuse vehicle to drive the refuse vehicle. The energy storage elements can also be used to supply energy to vehicle subsystems, like the lift system or the compactor.

SUMMARY

One exemplary embodiment relates to a refuse vehicle. The refuse vehicle includes a chassis, an energy storage device, a vehicle body, an electric power take-off system, and a hydraulic component. The energy storage device is supported by the chassis and is configured to provide electrical power to a prime mover. Activation of the prime mover selectively drives the refuse vehicle. The vehicle body is supported by the chassis, and includes an on-board receptacle for storing refuse therein. The electric power take-off system is positioned on the vehicle body, and includes an electric motor configured to drive a hydraulic pump to convert electrical power received from the energy storage device into hydraulic power. An amount of electrical power at least one of received by and provided to the electric motor is limited by a controller to control an output characteristic of the hydraulic pump. The hydraulic component is in fluid communication with the hydraulic pump and configured to operate using hydraulic power from the electric power take-off system.

One exemplary embodiment relates to a refuse vehicle. The refuse vehicle includes a chassis, an energy storage device, a vehicle body, an electric power take-off system, a lifting system, and a compactor. The energy storage device is supported by the chassis and is configured to provide electrical power to a prime mover. Activation of the prime mover selectively drives the refuse vehicle. The vehicle body is supported by the chassis, and includes an on-board receptacle for storing refuse therein. The electric power take-off system is positioned on the vehicle body, and includes an electric motor configured to drive a hydraulic pump to convert electrical power received from the energy storage device into hydraulic power. The hydraulic pump is a swashplate-style variable displacement pump. An amount of electrical power at least one of received by and provided to the electric motor is limited by a controller to control an output characteristic of the hydraulic pump. The lifting system is movable relative to the on-board receptacle using hydraulic power from the electric power take-off system. The compactor is positioned within the on-board receptacle and is movable within the on-board receptacle using hydraulic power from the electric power take-off system.

One exemplary embodiment relates to a refuse vehicle. The refuse vehicle includes a chassis, an energy storage device, a vehicle body, an electric power take-off system, a controller, and a lifting system. The energy storage device is supported by the chassis and is configured to provide electrical power to a prime mover. Activation of the prime mover selectively drives the refuse vehicle. The vehicle body is supported by the chassis, and includes an on-board receptacle for storing refuse therein. The electric power take-off system is positioned on the vehicle body, and includes an electric motor configured to drive a swashplate-style variable displacement hydraulic pump to convert electrical power received from the energy storage device into hydraulic power. The controller is configured to monitor a hydraulic fluid flow rate and a hydraulic fluid pressure downstream of the swashplate-style variable displacement hydraulic pump and adjust an output of the swashplate-style variable displacement hydraulic pump by adjusting an angle of a swashplate of the swashplate-style variable displacement hydraulic pump upon detecting that a product of the hydraulic fluid flow rate and the hydraulic fluid pressure exceed a threshold torque value. The lifting system is movable relative to the on-board receptacle using hydraulic power from the electric power take-off system.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
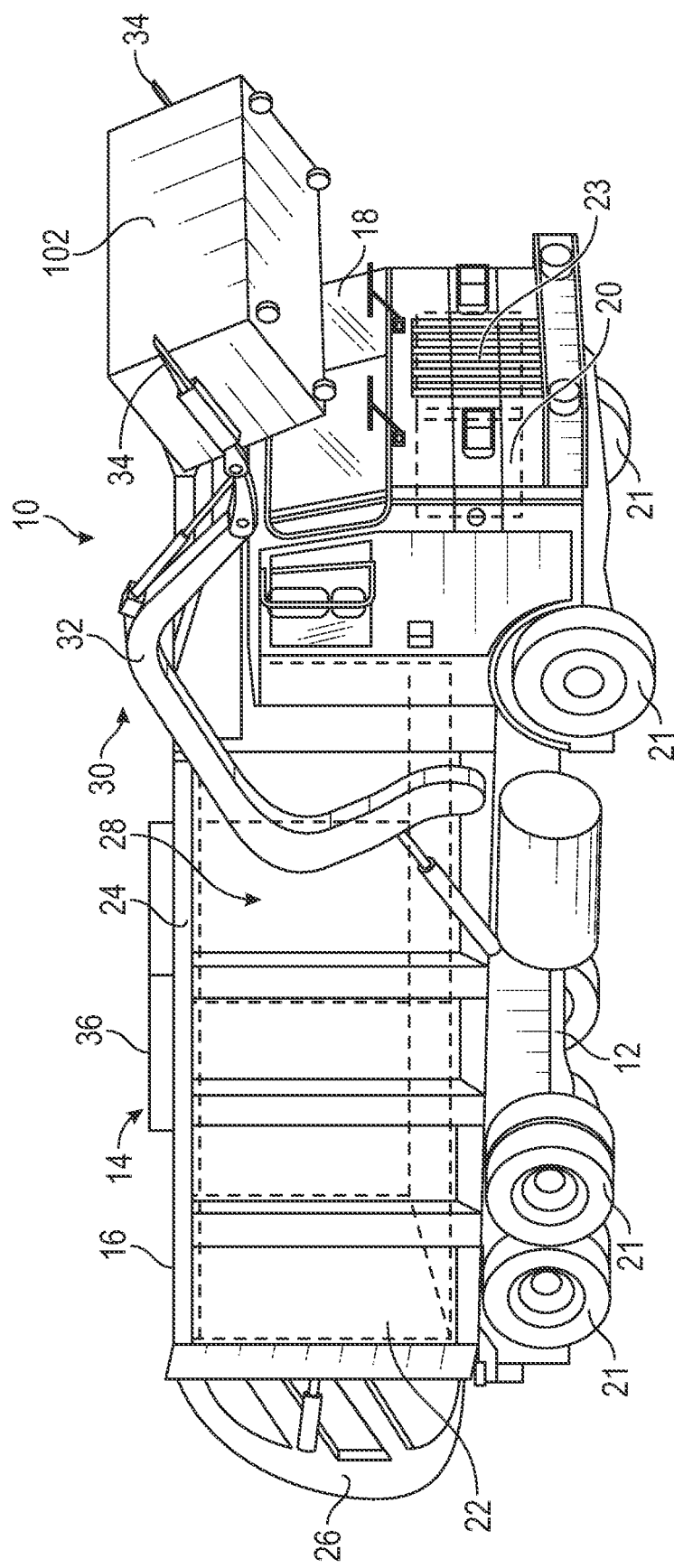
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to electric refuse vehicles. Electric refuse vehicles, or E-refuse vehicles, include an onboard energy storage device, like a battery, that provides power to a motor that produces rotational power to drive the vehicle. The energy storage device, which is commonly a battery or assembly of batteries, can be used to provide power to different subsystems on the E-refuse vehicle. The energy storage device is also configured to provide hydraulic power to different subsystems on the E-refuse vehicle through an electric power take-off (E-PTO) system. The E-PTO system receives electrical power from the energy storage device and provides the electrical power to an electric motor. The electric motor drives a hydraulic pump that provides pressurized hydraulic fluid to different vehicle subsystems, including the compactor and the lifting system.

The E-PTO system draws electrical power from the main battery of the refuse vehicle to drive the hydraulic pump. Because the E-PTO system draws electrical power from the same battery used to power the electric motor that drives the refuse vehicle, a controller (e.g., a power distribution unit) monitors and meters the power delivery to the E-PTO system. By controlling the power draw of the E-PTO system, the refuse vehicle can avoid a stalled condition that might otherwise occur from over-torqueing the hydraulic pump. The controller ensures that even when the hydraulic pump of the E-PTO is being driven, adequate electrical power is available from the battery to drive the refuse vehicle. The inclusion of the torque-limiting controller allows the use of smaller, less expensive electrical motors with the E-PTO system.

Referring to FIGS. 1-4, a vehicle, shown as refuse truck 10 (e.g., garbage truck, waste collection truck, sanitation truck, etc.), includes a chassis, shown as a frame 12, and a body assembly, shown as body 14, coupled to the frame 12. The body assembly 14 defines and includes an on-board receptacle 16 and a cab 18. The cab 18 is coupled to a front end of the frame 12, and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.). The refuse truck 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., batteries 23, ultra-capacitors, etc.), from an on-board generator (e.g., an internal combustion engine), or from an external power source (e.g., overhead power lines) and provide power to the various systems of the refuse truck 10.

According to an exemplary embodiment, the refuse truck 10 is configured to transport refuse from various waste receptacles within a municipality to a storage or processing facility (e.g., a landfill, an incineration facility, a recycling facility, etc.). As shown in FIGS. 1-4, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-4, the on-board receptacle 16 and collection chamber 28 are each positioned behind the cab 18. In some embodiments, the collection chamber 28 includes a hopper volume 52 and a storage volume. Refuse is initially loaded into the hopper volume 52 and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse truck 10).

Referring again to the exemplary embodiment shown in FIG. 1, the refuse truck 10 is a front-loading refuse vehicle. As shown in FIG. 1, the refuse truck 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). As shown in FIG. 1, the arms 32 are rotated to lift the refuse container over the cab 18. A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Figure 2:
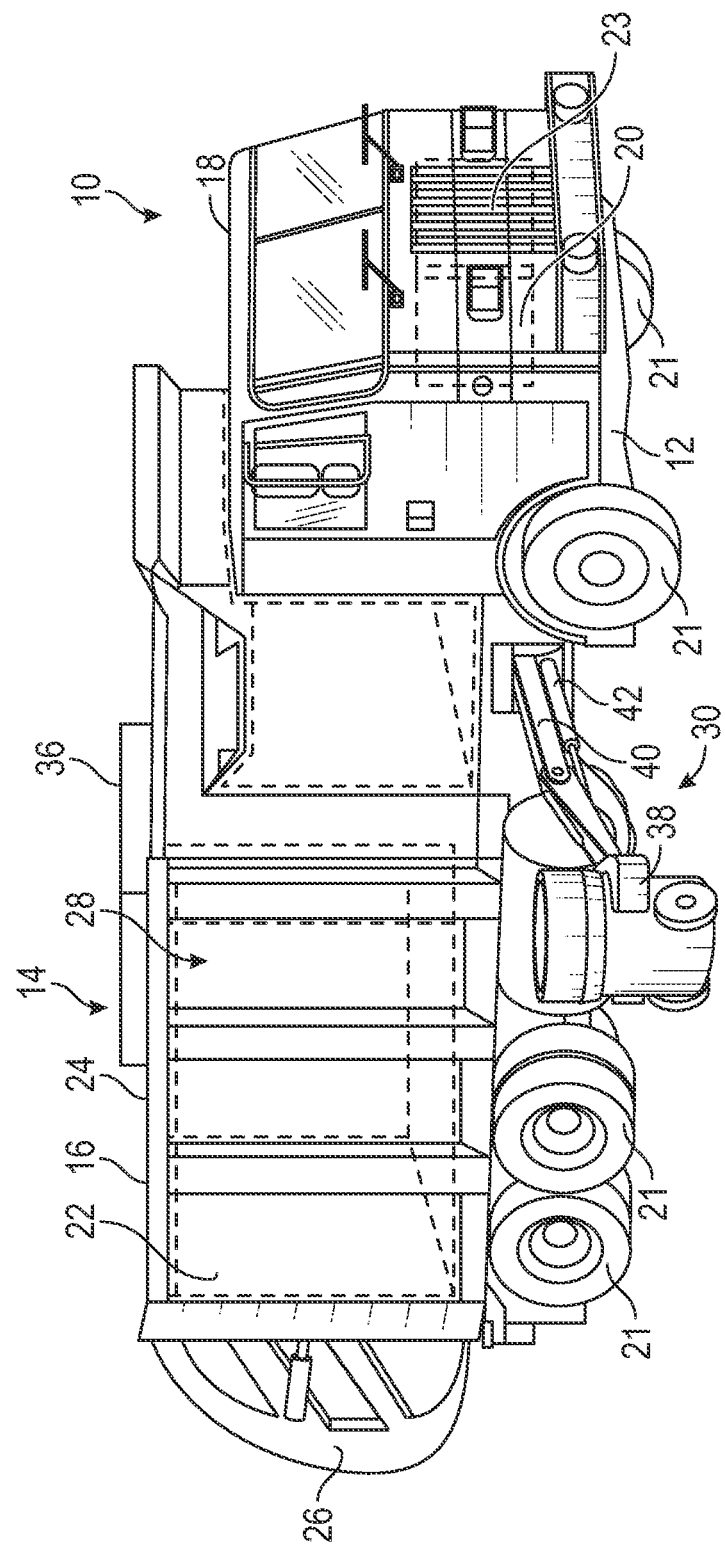
FIG. 2 is a perspective view of a side loading refuse vehicle according to an exemplary embodiment.

Referring to the exemplary embodiment shown in FIG. 2, the refuse truck 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotation, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Figure 3:
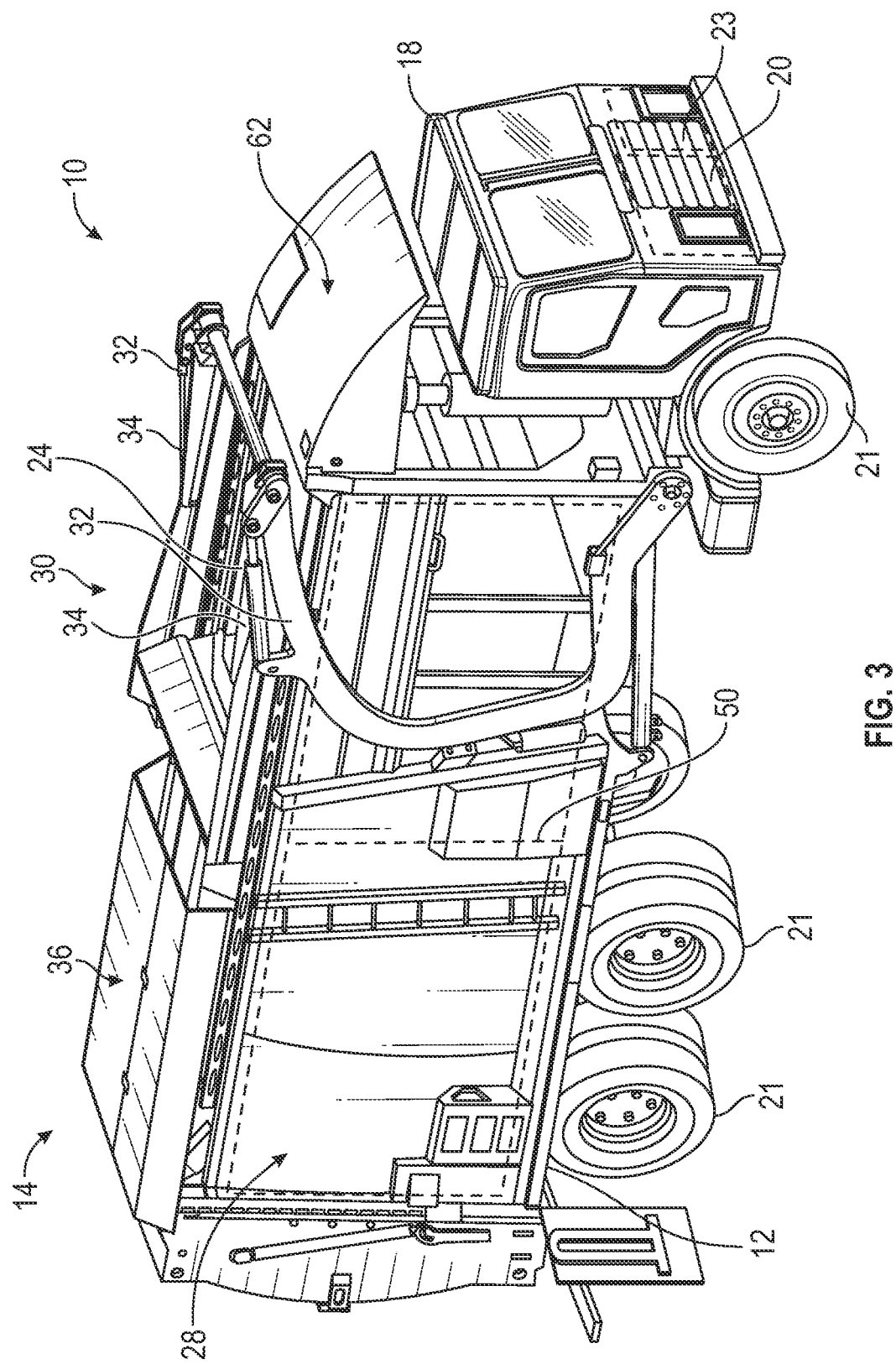
FIG. 3 is a front perspective view of an electric front loading refuse vehicle according to an exemplary embodiment.
Figure 4:
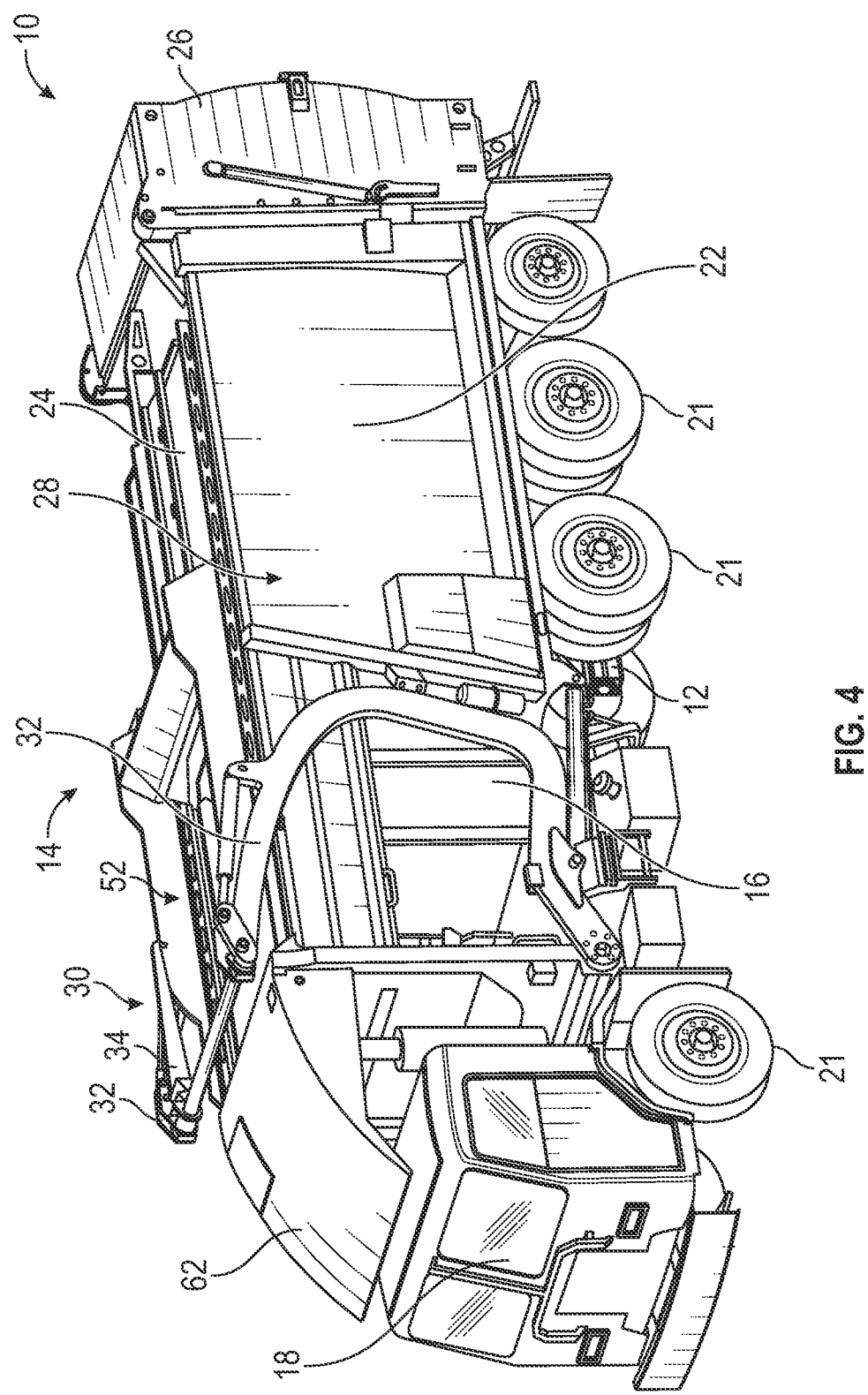
FIG. 4 is another perspective view of the electric front loading refuse vehicle of FIG. 3.

Referring to FIGS. 3-4, the refuse truck 10 is a front loading E-refuse vehicle. Like the refuse truck 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). A second actuator (e.g., a hydraulic cylinder) articulates the forks 34 to tip the refuse out of the container and into the hopper volume of the collection chamber 28 through an opening in the cover 24. The first actuators thereafter rotate the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIGS. 3-4, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor 20) rotates a transmission shaft, which in turn rotates the wheels 21 of the vehicle. In other examples, one or more wheels 21 have dedicated and direct-drive electric motors, such that the transmission can be omitted. The batteries 23 can supply electrical power to additional subsystems on the refuse truck 10, including additional electric motors, cab controls (e.g., climate controls, steering, lights, etc.), the lifting system 30, and/or the compactor 50, for example.

Figure 5:
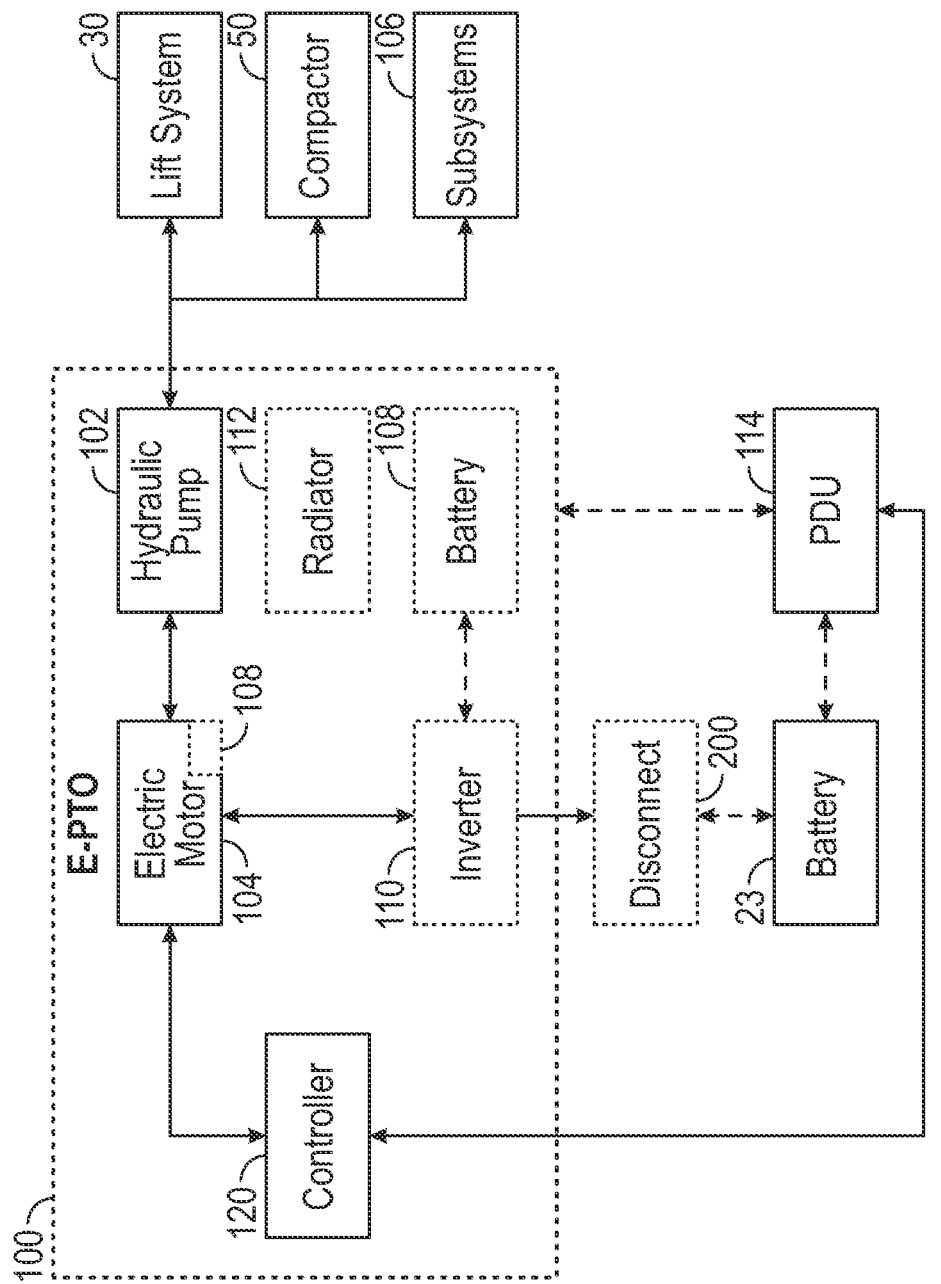
FIG. 5 is a schematic view of a control system of the refuse vehicle of FIG. 3.

The refuse truck 10 can be considered a hybrid refuse vehicle as it includes both electric and hydraulic power systems. As depicted in FIGS. 3-5, the refuse truck 10 includes an E-PTO system 100. The E-PTO system 100 is configured to receive electrical power from the batteries 23 and convert the electrical power to hydraulic power. In some examples, the E-PTO system 100 includes an electric motor 104 driving a hydraulic pump 102. The hydraulic pump 102 pressurizes hydraulic fluid onboard the refuse truck 10, which can then be supplied to various hydraulic components (e.g., hydraulic cylinders and other actuators, etc.) provided as part of the refuse truck 10. For example, the hydraulic pump 102 can provide pressurized hydraulic fluid to each of the hydraulic cylinders within the lift system 30 on the refuse truck. Additionally or alternatively, the hydraulic pump 102 can provide pressurized hydraulic fluid to a hydraulic cylinder or hydraulic cylinders controlling the compactor 50. In some embodiments, the hydraulic pump 102 also provides pressurized hydraulic fluid to the hydraulic cylinders that control a position and orientation of the tailgate 26. The hydraulic pump 102 can be a swashplate-type variable displacement pump, for example.

With continued reference to FIG. 5, the refuse truck 10 can include a disconnect 200 positioned between the one or more batteries 23 and the E-PTO system 100. The disconnect 200 provides selective electrical communication between the batteries 23 and the E-PTO system 100 that can allow the secondary vehicle systems (e.g., the lift system, compactor, etc.) to be decoupled and de-energized from the electrical power source. The disconnect 200 can create an open circuit between the batteries 23 and the E-PTO system 100, such that no electricity is supplied from the batteries 23 to either of the electric motor 104 or an inverter 110 that is coupled to the electric motor 104 to convert DC power from the batteries 23 to AC power for use in the electric motor 104. Without electrical power from the batteries 23, the electric motor 104 will not drive the hydraulic pump 102. Pressure within the hydraulic system will gradually decrease, such that none of the lifting system 30, compactor 50, or vehicle subsystems 106 relying upon hydraulic power will be fully functional. The refuse truck 10 can then be operated in a lower power consumption mode, given the reduced electrical load required from the batteries 23 to operate the refuse truck 10. The disconnect 200 further enables the refuse truck 10 to conserve energy when the vehicle subsystems are not needed, and can also be used to lock out the various vehicle subsystems to perform maintenance activities.

The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain optional even when the E-PTO system 100 is not receiving electrical power from the batteries 23. In some examples, the E-PTO system 100 operates independently of the battery 23, and includes its own dedicated secondary battery 108 that supplies DC electrical power to the inverter 110. The inverter 110 converts the DC electrical power to AC electrical power that can then be supplied to the electric motor 104. In still further embodiments, the dedicated secondary battery 108 is directly coupled to the electric motor 104 and supplies DC electrical power directly to the electric motor 104. With the secondary battery 108 present within the E-PTO system 100, the E-PTO system can be agnostic to the chassis type, and can be incorporated into all-electric, hybrid, diesel, CNG, or other suitable chassis types.

The E-PTO system 100 can include one or more thermal management systems or devices to alleviate heat generated by the E-PTO system 100. In some examples, the E-PTO system 100 includes a radiator 112. The radiator 112 can be a water-cooled heat exchanger that is configured to remove heat generated by the inverter 110, electric motor 104, and hydraulic pump 102 of the E-PTO system 100. In some examples, the radiator 112 draws power from the battery 23. Alternatively, the radiator 112 can be powered by the secondary battery 108 directly or through the inverter 110. In some examples, the E-PTO system 100 includes one or more fans to facilitate heat removal from the components within the E-PTO system 100.

In some examples, the battery 23 includes a controller, shown as power distribution unit (PDU) 114. The PDU 114 monitors the battery 23 and controls contactors within the battery 23 (or within associated equipment) to direct electrical power to the various systems within the refuse truck 10. In some examples, the PDU 114 prioritizes electrical power delivery through the refuse truck 10. The PDU 114 can ensure that critical functions (e.g., the prime mover 20, etc.) receive electrical power before auxiliary systems, like the E-PTO system 100, climate control systems, or radio, for example. Additionally or alternatively, the PDU 114 can be included within the E-PTO system 100 to control battery power draw from the battery 23 by the E-PTO system 100 (e.g., through the disconnect 200). In some examples, the PDU 114 can be configured to limit the permissible power draw from the battery 23 by the E-PTO system 100, which serves to limit the torque drawn by the hydraulic pump 102. The PDU 114 can be in communication with a controller 120, as described in additional detail below.

Figure 6:
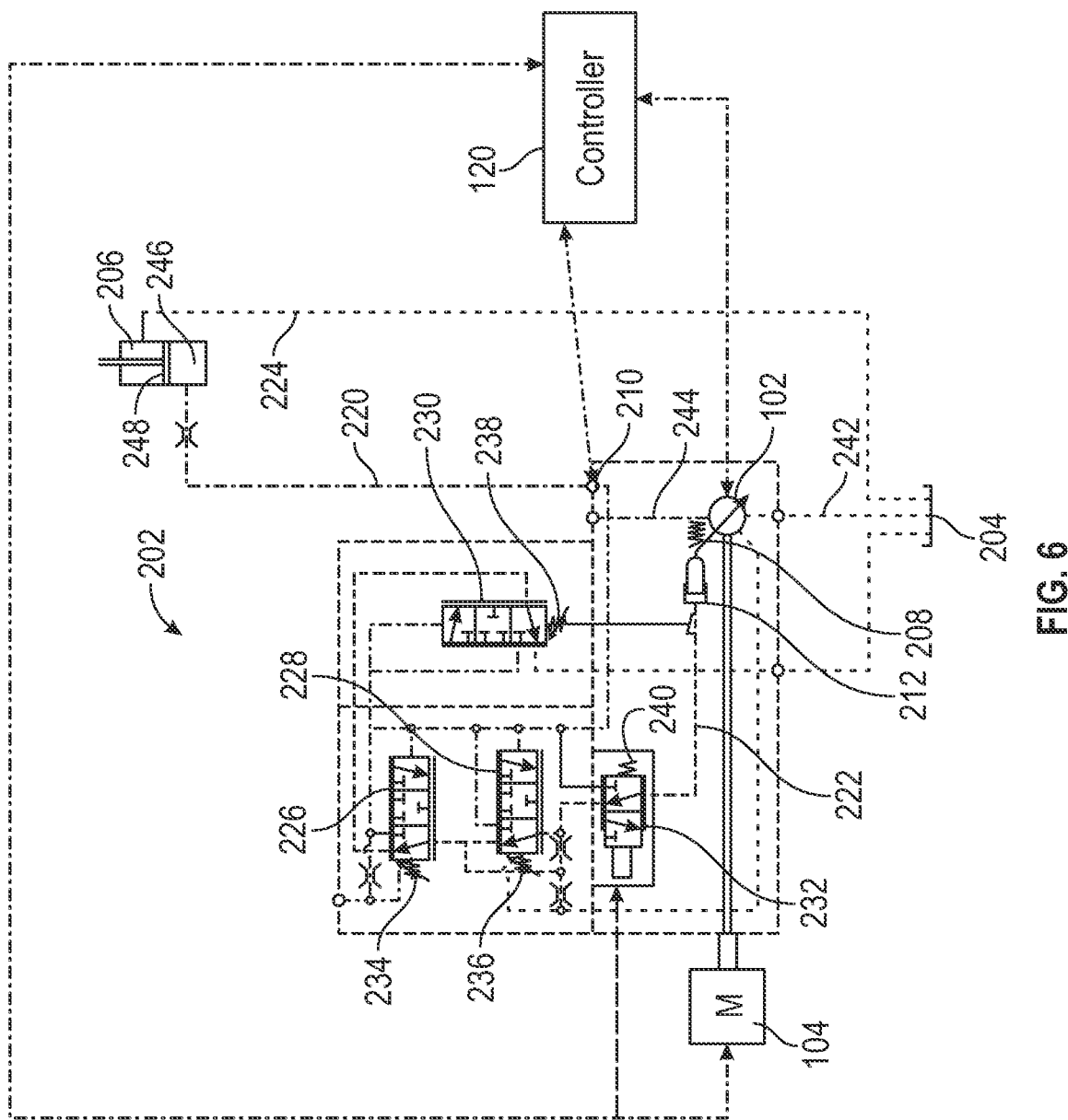
FIG. 6 is a hydraulic circuit that can be incorporated into the control system of FIG. 5.

As discussed previously, the hydraulic pump 102 can be one or more swashplate-style variable displacement pumps. Although described singularly throughout, the term "pump" should be considered to include one or more pumps. In some examples, and as shown in FIG. 6, the E-PTO system 100 incorporates a torque-limiting hydraulic circuit 202 to control operation of the pump 102 so that over-torqueing and potentially harmful stall conditions are avoided and power draw from the battery 23 is limited. The pump 102 is configured to provide pressurized hydraulic fluid from the hydraulic fluid reservoir 204 to the actuators (i.e., hydraulic cylinders) within the lifting system 30 to manipulate a position or orientation of the arms 32 and/or the forks 34, for example. The pump 102 can also supply pressurized hydraulic fluid from the hydraulic fluid reservoir 204 to a packer/compactor 50 and ejector system positioned within the on-board receptacle 16. In the schematic depicted in FIG. 6, the pump load 206 can represent any combination of one or more of the various actuators within the refuse truck 10 that are powered by the E-PTO system 100.

The pump 102 and electric motor 104 driving the pump 102 are in communication with a processing unit, shown as the controller 120. The controller 120 at least partially controls the pump 102 and electric motor 104 to deliver pressurized hydraulic fluid to accommodate variable pump loads 206 that may be requested during normal refuse truck 10 operation. The controller 120 receives signals from various inputs throughout the refuse truck 10 and can subsequently control different components within the hydraulic circuit 202 to execute different tasks. For example, the controller 120 may receive an input from one or more buttons within the cab 18 of the refuse truck 10 that prompt the lifting system 30 to move in order to raise and empty the contents of a waste receptacle into the on-board receptacle 16 of the refuse truck 10. Upon receiving an input requesting an adjustment of the pump load 206 (e.g., requested movement of the lifting system 30), the controller 120 can activate or adjust an output of the electric motor 104 and pump 102 to deliver pressurized hydraulic fluid from the hydraulic fluid reservoir 204 to the one or more actuators forming the pump load 206 to carry out the requested operation.

A sensor 210 positioned within the hydraulic circuit 202 can monitor a pressure and/or a flow rate of hydraulic fluid downstream of the pump 102 to determine a current pump flow rate and/or the pressure of hydraulic fluid being output by the pump 102. Another sensor 212 coupled to the pump 102 can measure a current angle of a swashplate 208 on the pump 102, which corresponds to a current pump 102 displacement. In some examples, the controller 120 receives data from each of the sensors 210, 212 and, using the data received form the sensors 210, 212, determines an appropriate adjustment to the angle of the swashplate 208 to meet the new requested pump load 206 corresponding with the input received (e.g., to execute a compactor or ejection stroke or lift a waste receptacle with the lifting system 30) by the controller 120. The controller 120 then adjusts the swashplate 208 angle in order to arrive at the swashplate angle that was determined by the PDU 114 so that the pump 102 can efficiently deliver the desired pump flow or fluid pressure associated with the requested pump load 206. In some examples, the controller 120 communicates with the PDU 114 to request a power draw from the battery 23 to meet the desired pump conditions.

The hydraulic circuit 202 includes a series of valves and pressure lines that are configured to direct pressurized hydraulic fluid between the hydraulic fluid reservoir 204, the pump 102, and the load 206 to execute operations with the various actuators on the refuse truck 10. The valves and pressure lines are arranged so that the hydraulic circuit 202 is divided into a high pressure line 220, an intermediate pressure or "control" line 222, and a low pressure or "drain" line 224. One or more valves 226, 228, 230, 232 are positioned between the lines 220, 222, 224 and selectively provide fluid communication between the lines 220, 222, 224 to control operation of the pump 202 and distribute hydraulic fluid to the various actuators within the pump load 206. As depicted in FIG. 6, the valves 226, 228, 230 can each be spool valves that include several positions that define different flow paths through the valves 226, 228, 230. The valve 232 can be a solenoid valve that is adjustable through multiple positions to control fluid flow rate through the hydraulic circuit 202. In some examples, the valve 226 acts as a load sensing valve that monitors pressure drop within the hydraulic circuit 202 and operates to maintain a constant fluid flow rate through the valve 226. The valve 228 can act as a compensator valve that opens a pressure relief fluid pathway through the valve 228 when pressure within the hydraulic circuit 202 rises above a threshold level (e.g., a cutout pressure). The valve 230 can act as a torque limiting or torque reducing valve that adjusts a pump flow rate when hydraulic pressure within the high pressure line 220 exceeds a threshold valve. Similarly, the valve 232 can provide torque limiting control. The valve 232 can be controlled by the controller 120 to activate in response to a detected fluid pressure above a threshold rate, which may be determined by a pump torque limiting control curve, as explained in additional detail below.

During normal operation, and as depicted in FIG. 6, each of the valves 226, 228, 230, 232 are biased into their first open positions. In the first open position, each of the valves 226, 228, 230, 232 allow hydraulic fluid flow into and through the valves 226, 228, 230, 232. The valves 226, 228, 230, 232 can each be biased into their first positions by biasing elements, shown as springs 234, 236, 238, 240. The springs 234, 236, 238, 240 provide a spring force that opposes movement of the valves 226, 228, 230, 232 away from their respective first open positions toward intermediate closed positions or to second open positions. The valves 226, 228, 230, 232 can each be placed in fluid communication with the high pressure line 220. Fluid pressure within the high pressure line 220 can act against the springs 234, 236, 238 to move the valves toward their respective intermediate closed or second open positions. The valve 232 is controlled by a solenoid actuator that can be energized by the controller 120 and/or the PDU 114, for example.

When the controller 120 initially receives or otherwise generates an input to adjust the pump load 206 (e.g., to provide pressurized hydraulic fluid to an actuator), the pump 102 begins to operate to deliver the requested pump load 206 from the hydraulic fluid reservoir 204. Hydraulic fluid is drawn from the hydraulic fluid reservoir 204 into the pump 202 along a first branch 242. The fluid is pressurized within the pump 102 and directed outward along a first branch 244 of the high pressure line 220. The pressurized hydraulic fluid is delivered through the first branch 244 to the pump load 206, which expands and extends the actuators so that the actuators can execute the various functions inputted to the controller 120. As depicted in FIG. 6, hydraulic fluid inputted through the first branch 244 into the actuator reservoir 246 pushes a piston 248 of the pump load 206 outward and extends the one or more actuators within the pump load 206.

As discussed above, the pump 102 is a swashplate-type variable displacement pump. The pump 102 includes at least two pistons that operate to compress fluid. The stroke length of the pistons, which is determined by the angle of the swashplate 208, determines the displacement (e.g., flow rate) of hydraulic fluid that exits the pump 102. Because the sensor 212 monitors the position (e.g., the angle) of the swashplate 208, the sensor 212 can effectively serve as a flow rate sensor. By communicating the monitored position of the swashplate 208 to the controller 120, the controller 120 can then determine (e.g., calculate or access from a table of values) the flow rate (Q) out of the pump 102. The sensor 212 can be a mechanical position sensor (e.g., an encoder or an LVDT).

The sensor 210 can be used to monitor other characteristics of pump operation by monitoring the pressurized hydraulic fluid within the high pressure line 220. The sensor 210 is positioned along the first branch 244 of the high pressure line 220 to monitor one or more pump parameters. For example, the sensor 210 can monitor the hydraulic fluid pressure within the high pressure line 220. By being located just downstream of the pump 102, the sensor 210 provides a near real-time measurement of pump output. Using the measured hydraulic fluid pressure within the high pressure line 220 and the measured orientation of the swashplate 208 to determine the flow rate through the pump 102, the controller 120 can calculate the torque experienced by (and required to drive) the electric motor 104 that drives the pump 102. The torque (T) experienced by the motor of the pump 102 is the product of the pump pressure (P) and the flow rate (Q) through the pump 102 (i.e., T=P*Q). The calculated torque corresponds to the amount of electric power draw from the battery 23 to achieve the desired pump parameters.

The pump 102 is configured to provide pressurized hydraulic fluid from the hydraulic fluid reservoir 204 to multiple actuators that together define the pump load 206. In some instances, the pump load 206 may exceed the allowable pressure or flow rate that the pump 102 can produce. For example, if the lifting system 30 is attempting to raise a heavy waste receptacle while the compactor system 50 is executing a compactor stroke within the on-board receptacle 16, further expansion of the hydraulic cylinders may be opposed. The resistance provided by the mass of the heavy waste receptacle and the refuse within the receptacle's 16 resistance to packing can oppose further movement of the hydraulic cylinders attempting to perform the lifting and compacting functions, respectively. Because the flow rate of the pump 102 does not change (e.g., the amount of hydraulic fluid necessary to move the piston 248 to a desired position within the actuator reservoir 246 remains constant), the resistance to movement causes a pressure spike within the first branch 244 of the high pressure line 220. With the flow rate (Q) remaining constant, the pressure spike (P) within the first branch 244 of the high pressure line 220 causes a subsequent spike in torque experienced by the pump motor 104 and power draw requested by the E-PTO system 100 from the battery 23.

If the torque experienced by the electric motor 104 approaches or exceeds the amount of torque that the electric motor 104 can produce, the electric motor 104 will slow or stall and potentially burn out. To avoid these potentially fatal motor conditions, the valve 232 is arranged to override the hydraulic circuit 202 and control the pump 102 when the torque draw from the electric motor 104 exceeds a set threshold limit defined by the controller 120. The valve 232 controls flow between the high pressure line 220 and the intermediate control line 222, which in turn controls the angle of the swashplate 208 and the displacement of the pump 102. Opening the valve 232 further will increase the flow through the intermediate control line 222, which will drop the displacement of the pump 102 and reduce the likelihood of stalling the pump 102 and/or electric motor 104 of the E-PTO system 100.

The valve 232 is also used to control and limit the amount of allowable torque drawn from the battery 23 so that primary vehicle systems (e.g., the prime mover 20) can be supplied with sufficient power to drive the refuse truck 10 at all times. The controller 120 and/or the PDU 114 can be programmed with a pump torque control curve (e.g., pump control curve 308, shown in FIG. 7) that defines permissible flow rate and pressure target limits for the pump 102 and motor 104. The controller 120 can control a position of the valve 232 to adjust flow through the valve 232, which in turn adjusts the pressure within the control line 222. The pressure within the control line 222 controls the amount of force applied to the swashplate 208 against the bias of a spring 216. Accordingly, opening or closing the valve 232 adjusts an angle of the swashplate 208 and displacement of the variable displacement pump 102, which in turn adjusts an amount of torque draw requested by the pump 102 and electrical motor 104. The controller 120 can communicate with the sensors 210, 212 to ensure that the pump 102 and electrical motor 104 do not exceed the allowable torque limits.

Figure 7:
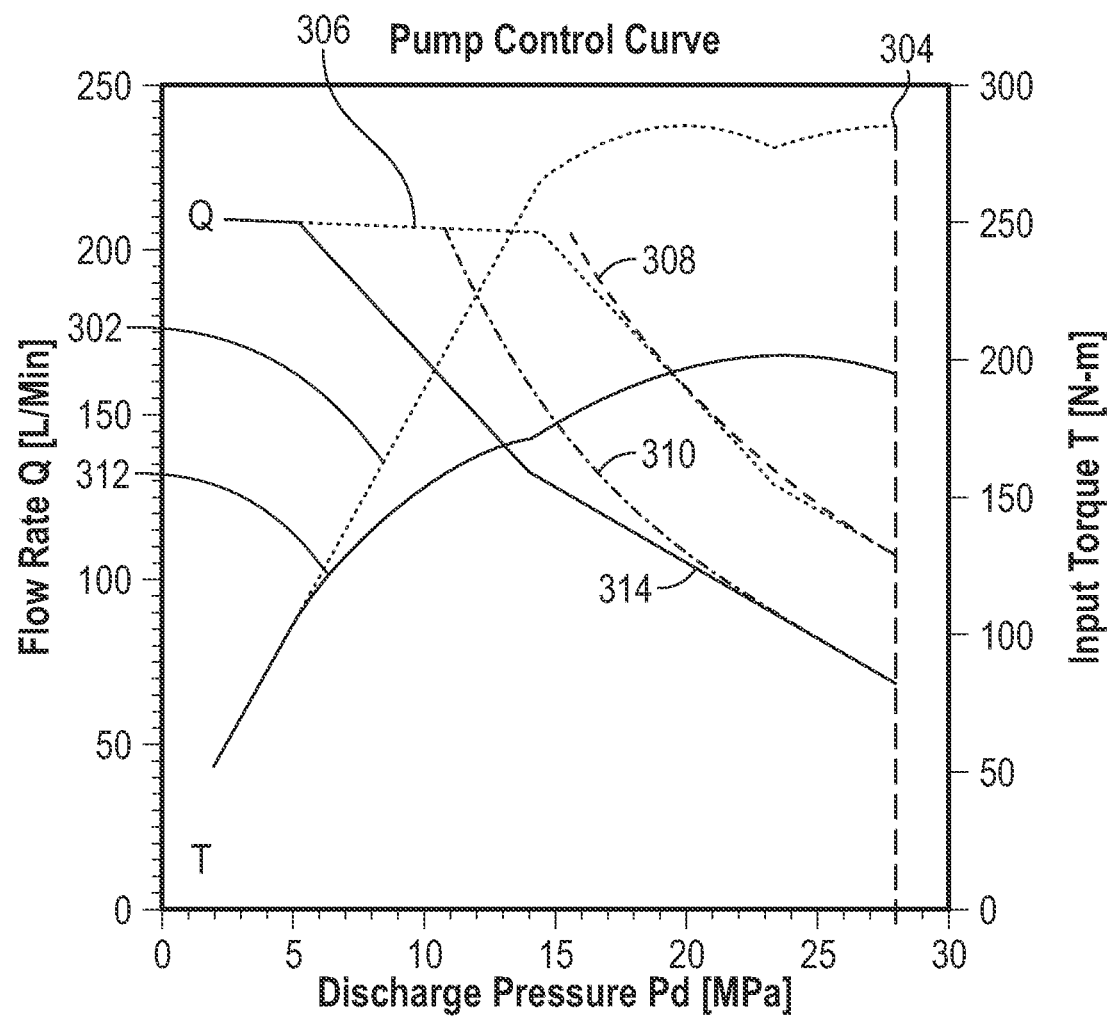
FIG. 7 is a graphical representation of a pump performance curve, depicting different control parameters that can be incorporated into the pump within the control system of FIG. 5.

The controller 120 and/or the PDU 114 can be programmed to operate the electric motor 104 and the pump 102 of the E-PTO system 100 according to specified torque limits that restrict the permissible power draw of the electric motor 104 from the battery 23. Referring to FIG. 7, an example pump performance control curve for the hydraulic pump 102 is shown. As explained above, pump torque is a function of pressure multiplied by flow rate, and determines how much power is needed from the battery 23 to execute a function. A first curve 302 demonstrates the performance of a first non-limited hydraulic pump 102 that is operated independent of (or without) the PDU 114 and/or the controller 120. The curve 302 extends linearly over a first range of pressures and flow rates until reaching a maximum flow rate. As the pressure continues to rise within the pump 102, the pressure and flow rate eventually reach a stalling torque at point 304. At the stalling torque, the pump 102 ceases and both pressure and flow rate through the pump drop to zero. Accordingly, the torque will also fall to zero.

The second curve 306 demonstrates the operation of the same hydraulic pump 102, but operating within a torque-limiting setting defined by the PDU 114 or the controller 120

(in the battery 23 or within the E-PTO system 100). The controller 120 defines a torque limiting curve 308, which constrains the pump performance to minimize the electrical power draw of the electric motor 104 from the battery 23. As the pump approaches a certain pressure (e.g., 15 MPa), the pump reaches the torque limiting control curve 308. The controller 120 then monitors the pump performance (e.g., using sensors 210, 212) so as not to exceed the defined limits established by the control curve 308. To remain within the parameters of acceptable operation, the controller 120 will adjust a position of the valve 232 to reduce the flow rate through the pump 102 as the pressure rises, which in turn reduces the torque and power draw required to operate the hydraulic pump 102. By limiting the possible pump 102 input torque, the controller 120 ensures that power consumption by the E-PTO system 100 does not exceed allowable limits that might otherwise interfere with the ability to drive the vehicle 10, for example. Additionally, smaller, less expensive electric motors 104 can be used within the E-PTO system 100 because the battery 23 does not need to supply power under maximum pump output operating conditions, which are disabled. Finally, the pump 102 can be operated within its most efficient ranges.

Different control curves 308, 310 can be used and adapted for different pump sizes and applications. As demonstrated in FIG. 7, a control curve 310 can be designed for a smaller pump 102 as well. The non-limited curve 312 of the smaller capacity pump 102 can be configured with a reduced control curve 310 that again reduces the permissible power draw from the battery 23, which again reduces the power draw for the E-PTO system and prioritizes primary vehicle functions. The curve 314 follows the limited torque curve 310 for a smaller pump, demonstrating the different potential controlling parameters, depicting limit-based control, rather than target-based control.

Figure 8:
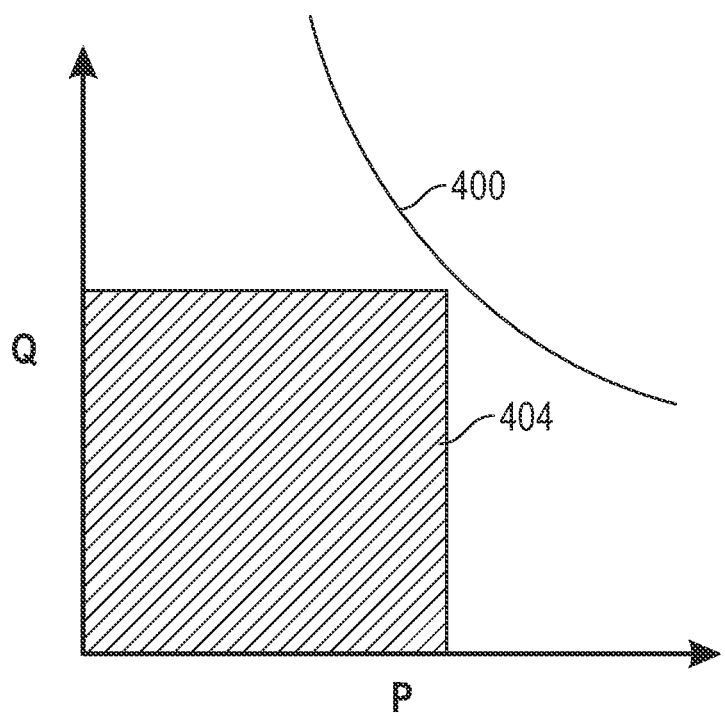
FIG. 8 is a graphical representation of a pump performance curve, depicting a hydraulic pump within the control system of FIG. 5 without torque limiting control.
Figure 9:
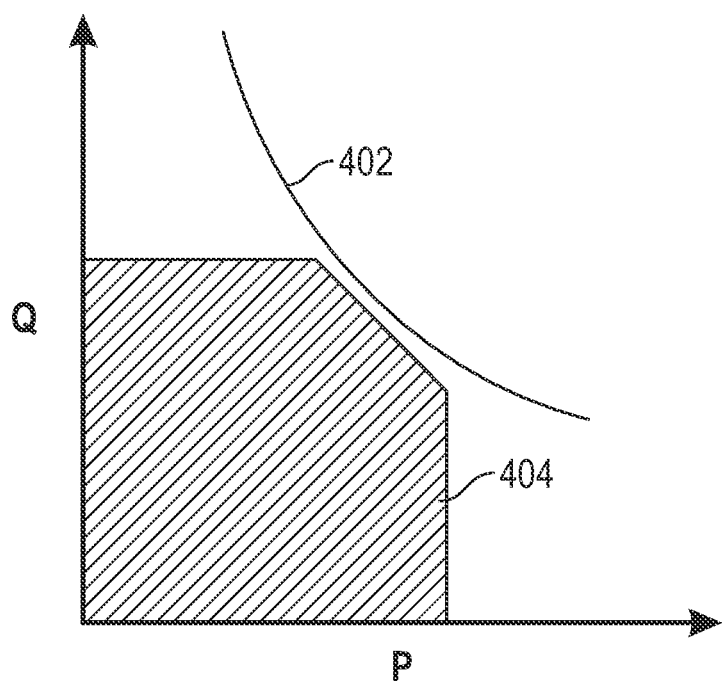
FIG. 9 is a graphical representation of a pump performance curve, depicting a hydraulic pump within the control system of FIG. 5 with torque limiting control, according to an exemplary embodiment.

As depicted in FIGS. 8-9, the use of the torque limiting control curve within the controller 120 and the E-PTO system 100 can reduce the amount of power drawn from the battery 23. FIG. 8 depicts a pump motor torque curve 400 of a pump 102 without a torque limiting valve 232 and controller 120 described above, while FIG. 9 and pump motor torque curve 402 depicts the same pump with the torque limiting valve 232 and controller 120. While the overall operating range 404 of the motor 104 and the pump 102 is slightly reduced, the pump 102 avoids maximum output torque conditions that could otherwise affect the operation of the refuse truck 10. By limiting permissible torque draw from the battery 23 and limiting the possible flow characteristics of the pump 102, smaller, less expensive and more efficient motors 104 can be used with the E-PTO, which reduces packaging size, weight, and cost in producing the refuse truck 10.

Using the previously described systems and methods, a refuse truck can be effectively outfitted with an E-PTO system that can convert electrical power to hydraulic power to provide pressurized hydraulic fluid to various subsystems on the vehicle. The E-PTO system can be packaged and retrofit onto existing refuse trucks and can be incorporated into various different vehicle chassis types. The E-PTO system can be powered by an auxiliary or self-contained power source, or can draw power from the main battery of the vehicle. The E-PTO system includes a torque limiting controller and valve that together regulate a pump of the E-PTO so that the power draw from the main battery of the refuse truck is maintained below a threshold value that ensures critical vehicle functions can continue to be performed. Smaller and less expensive motors can be incorporated into the E-PTO system to achieve the same or similar permissible pump parameters that do not exceed the allowable torque limits set by the controller and valve.

Although the description of the E-PTO system and disconnect have been described within the context of a front end loading refuse truck, the same or similar systems can also be included in both side loading and rear end loading refuse trucks without significant modification. Accordingly, the disclosure should be considered to encompass the E-PTO system and pump in isolation and incorporated into any type or variation of refuse vehicle. Additionally, as described above, multiple torque-limited pumps may be incorporated into a single E-PTO system without departing from the scope of the present disclosure.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse truck as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:
    a chassis;
    an energy storage device supported by the chassis and configured to provide electrical power to a prime mover, wherein activation of the prime mover selectively drives the refuse vehicle;
    a vehicle body supported by the chassis, the vehicle body including an on-board receptacle for storing refuse therein;
    an electric power take-off system positioned on the vehicle body, the electric power take-off system including an electric motor configured to drive a hydraulic pump to convert electrical power received from the energy storage device into hydraulic power, wherein an amount of electrical power at least one of received by and provided to the electric motor is limited by a controller to control an output characteristic of the hydraulic pump; and
    a hydraulic component in fluid communication with the hydraulic pump and configured to operate using hydraulic power from the electric power take-off system,
    wherein the hydraulic pump is a swashplate-style variable displacement pump, and
    wherein the controller controls the output characteristic of the hydraulic pump by activating a solenoid valve, wherein activating the solenoid valve selectively opens a flow path to introduce pressurized hydraulic fluid toward a swashplate of the hydraulic pump to adjust an angle of the swashplate.

2. The refuse vehicle of claim 1, wherein adjusting the angle of the swashplate using pressurized fluid adjusts a flow rate of the hydraulic pump, wherein adjusting the flow rate of the hydraulic pump reduces an amount of electrical power needed to drive the hydraulic pump.

3. The refuse vehicle of claim 1, wherein adjusting the angle of the swashplate using pressurized fluid adjusts a discharge pressure of the hydraulic pump, wherein adjusting the discharge pressure of the hydraulic pump reduces an amount of electrical power needed to drive the hydraulic pump.

4. The refuse vehicle of claim 1, wherein the solenoid valve is biased toward a flow blocking position, wherein a flow path between an outlet of the hydraulic pump and the swashplate is obstructed by the solenoid valve in the flow blocking position.

5. The refuse vehicle of claim 4, wherein when the solenoid valve is activated, the solenoid valve transitions to an open position fluidly coupling the outlet of the hydraulic pump with the swashplate.

6. The refuse vehicle of claim 1, wherein the controller limits a rate of electrical power drawn from the energy storage device by reducing an amount of torque experienced by the hydraulic pump.

7. The refuse vehicle of claim 1, wherein the controller monitors a position of the swashplate using a sensor, wherein the controller is configured to calculate a hydraulic fluid flow rate from the hydraulic pump based upon the monitored position of the swashplate, and wherein the controller is configured to activate the solenoid valve in response to determining that the hydraulic fluid flow rate exceeds a threshold flow rate.

8. The refuse vehicle of claim 7, wherein the controller monitors a fluid pressure downstream of an outlet of the hydraulic pump using a pressure sensor, and wherein the controller is configured to activate the solenoid valve in response to receiving an indication that a product of the hydraulic fluid flow rate and the fluid pressure exceed a threshold torque value.

9. The refuse vehicle of claim 8, wherein the controller is programmed with a pump torque curve, and wherein the controller is configured to adjust the position of the swashplate to adjust the hydraulic fluid flow rate of the hydraulic pump to remain below the pump torque curve.

10. The refuse vehicle of claim 1, further comprising a compactor positioned within the on-board receptacle, wherein the compactor is movable within the on-board receptacle using hydraulic power from the electric power take-off system.

11. The refuse vehicle of claim 1, further comprising a disconnect positioned between the energy storage device and the electric power take-off system, wherein the disconnect is configured to selectively decouple the electric power take-off system from the energy storage device to disable the hydraulic pump.

12. A refuse vehicle comprising:
    a chassis;
    an energy storage device supported by the chassis and configured to provide electrical power to a prime mover, wherein activation of the prime mover selectively drives the refuse vehicle;
    a vehicle body supported by the chassis, the vehicle body including an on-board receptacle for storing refuse therein;
    an electric power take-off system positioned on the vehicle body, the electric power take-off system including an electric motor configured to drive a hydraulic pump to convert electrical power received from the energy storage device into hydraulic power, wherein an amount of electrical power at least one of received by and provided to the electric motor is limited by a controller to control an output characteristic of the hydraulic pump, and wherein the hydraulic pump is a swashplate-style variable displacement pump;
    a lifting system movable relative to the on-board receptacle using hydraulic power from the electric power take-off system; and
    a compactor positioned within the on-board receptacle and movable within the on-board receptacle using hydraulic power from the electric power take-off system,
    wherein the controller controls the output characteristic of the hydraulic pump by activating a solenoid valve, wherein activating the solenoid valve selectively opens a flow path to introduce pressurized hydraulic fluid toward a swashplate of the hydraulic pump to adjust an angle of the swashplate.

13. The refuse vehicle of claim 12, wherein adjusting the angle of the swashplate using pressurized fluid adjusts a flow rate of the hydraulic pump, wherein adjusting the flow rate of the hydraulic pump reduces an amount of electrical power needed to drive the hydraulic pump.

14. The refuse vehicle of claim 13, wherein the controller monitors a position of the swashplate using a sensor, wherein the controller is configured to calculate a hydraulic fluid flow rate from the hydraulic pump based upon the monitored position of the swashplate, and wherein the controller is configured to activate the solenoid valve in response to determining that the flow rate exceeds a threshold flow rate.

15. The refuse vehicle of claim 14, wherein the controller monitors a fluid pressure downstream of an outlet of the hydraulic pump using a pressure sensor, and wherein the controller is configured to activate the solenoid valve in response to receiving an indication that a product of the hydraulic fluid flow rate and the fluid pressure exceed a threshold torque value.

16. The refuse vehicle of claim 15, wherein the threshold torque value is defined by a pump torque curve that is programmed into the controller.

17. A refuse vehicle comprising:
a chassis;
an energy storage device supported by the chassis and configured to provide electrical power to a prime mover, wherein activation of the prime mover selectively drives the refuse vehicle;
a vehicle body supported by the chassis, the vehicle body including an on-board receptacle for storing refuse therein;
an electric power take-off system positioned on the vehicle body, the electric power take-off system including an electric motor configured to drive a swashplate-style variable displacement hydraulic pump to convert electrical power received from the energy storage device into hydraulic power;
a controller configured to monitor a hydraulic fluid flow rate and a hydraulic fluid pressure downstream of the swashplate-style variable displacement hydraulic pump and adjust an output of the swashplate-style variable displacement hydraulic pump by adjusting an angle of a swashplate of the swashplate-style variable displacement hydraulic pump upon detecting that a product of the hydraulic fluid flow rate and the hydraulic fluid pressure exceed a threshold torque value; and
a lifting system movable relative to the on-board receptacle using hydraulic power from the electric power take-off system.

* * * * *